(12) United States Patent
Jung et al.

(10) Patent No.: US 11,494,118 B2
(45) Date of Patent: Nov. 8, 2022

(54) STORAGE DEVICE AND OPERATING METHOD THEREOF

(71) Applicant: SK hynix Inc., Gyeonggi-do (KR)

(72) Inventors: Seung Wan Jung, Gyeonggi-do (KR); Seung Ok Han, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 235 days.

(21) Appl. No.: 16/807,705

(22) Filed: Mar. 3, 2020

(65) Prior Publication Data

US 2021/0064286 A1 Mar. 4, 2021

(30) Foreign Application Priority Data

Aug. 29, 2019 (KR) .......................... 10-2019-0106404

(51) Int. Cl.
G06F 3/06 (2006.01)

(52) U.S. Cl.
CPC .......... *G06F 3/0659* (2013.01); *G06F 3/0611* (2013.01); *G06F 3/0656* (2013.01); *G06F 3/0679* (2013.01)

(58) Field of Classification Search
CPC .... G06F 3/0659; G06F 3/0611; G06F 3/0656; G06F 3/0679; G06F 3/061; G06F 3/0614; G06F 3/0658; G06F 13/1673
See application file for complete search history.

(56) References Cited

U.S. PATENT DOCUMENTS

| | | | | |
|---|---|---|---|---|
| 5,916,309 A * | 6/1999 | Brown | ..................... | G06F 5/065 710/52 |
| 2015/0326481 A1 * | 11/2015 | Rector | ................ | H04L 12/6418 370/236 |
| 2016/0299697 A1 * | 10/2016 | Chen | ..................... | G06F 3/0685 |
| 2018/0173464 A1 * | 6/2018 | Wongso | .............. | G06F 11/3034 |
| 2019/0087332 A1 * | 3/2019 | Jun | ........................ | G06F 3/0679 |

FOREIGN PATENT DOCUMENTS

| | | |
|---|---|---|
| KR | 10-2004-0047088 | 6/2004 |
| KR | 10-2015-0047083 | 5/2015 |
| KR | 10-2019-0032716 | 3/2019 |

OTHER PUBLICATIONS

Zhang, Wei, et al. "Adaption resizing communication buffer to maximize lifetime and reduce delay for WVSNs." IEEE Access 7 (2019): 48266-48287. (Year: 2019).*

* cited by examiner

*Primary Examiner* — Kalpit Parikh
(74) *Attorney, Agent, or Firm* — IP & T Group LLP

(57) ABSTRACT

A storage device includes a nonvolatile memory; a controller configured to control a write operation of the nonvolatile memory according to a write request received from a host and transmit a response to the write request to the host; and write buffers configured to store write data received with the write request. The controller is further configured to: set a response transmission delay time based on an available size of the write buffers, a minimum response transmission delay time, and a maximum response transmission delay time, transmit the response to the write request to the host after the response transmission delay time passes, and dynamically adjust, as the available size of the write buffers changes, the response transmission delay time within a range from the minimum response transmission delay time to the maximum response transmission delay time.

18 Claims, 14 Drawing Sheets

STORAGE DEVICE AND OPERATING METHOD THEREOF

CROSS-REFERENCE TO RELATED APPLICATION

The present application claims priority under 35 U.S.C. § 119(a) to Korean application number 10-2019-0106404, filed on Aug. 29, 2019, in the Korean Intellectual Property Office, which is incorporated herein by reference in its entirety.

BACKGROUND

1. Technical Field

Various embodiments generally relate to an electronic device, and more particularly, to a storage device and an operating method thereof.

2. Related Art

Recently, a paradigm for a computer environment has transitioned to ubiquitous computing which enables a computer system to be used anytime and anywhere. Therefore, the use of portable electronic devices such as cellular phones, digital cameras, and notebook computers is rapidly increasing. Such portable electronic devices generally use a data storage device using a memory apparatus. The data storage device is used to store data used in the portable electronic devices.

A data storage device using the memory apparatus is advantageous in that stability and durability are superior due to the absence of a mechanical driving unit, information access speed is very fast, and power consumption is small. Examples of data storage devices having such advantages include a universal serial bus (USB) memory apparatus, a memory card having various interfaces, a universal flash storage (UFS) device, and a solid state drive.

SUMMARY

A storage device capable of dynamically adjusting a response transmission delay to a host and an operating method thereof are described herein.

In an embodiment, a storage device includes a nonvolatile memory; a controller configured to control an operation of a write operation of the nonvolatile memory according to a write request received from a host and transmit a response to the write request to the host; and write buffers configured to store write data received with the write request. The controller is further configured to: set a response transmission delay time based on an available size of the write buffers, a minimum response transmission delay time, and a maximum response transmission delay time, transmit the response to the write request to the host after the response transmission delay time passes, and dynamically adjust, as the available size of the write buffers changes, the response transmission delay time within a range from the minimum response transmission delay time to the maximum response transmission delay time.

In an embodiment, an operating method of a storage device includes: receiving, by the controller, a write request and write data from a host; acquiring, by the controller from the write buffers, buffer usage information including an available size of the write buffers; setting, by the controller, a response transmission delay time based on the available size of the write buffers, a minimum response transmission delay time, and a maximum response transmission delay time; transmitting, by the controller, a response to the write request to the host after the set response transmission delay time passes; and dynamically adjusting, by the controller, as the available size of the write buffers changes, the response transmission delay time within a range from the minimum response transmission delay time to the maximum response transmission delay time.

In an embodiment, a controller for controlling a memory device includes: a write buffer configured to buffer write data to be stored in the memory device; a command queue configured to queue a write request corresponding to the write data; a response delay configured to respond to the write request according to an actual response transmission delay time based on a total size of the write buffer, a threshold usage size of the write buffer, a currently available size of the write buffer, and minimum and maximum response transmission delay times; and a processor configured to control the memory device to store therein the write data in response to the write request.

In accordance with the present embodiments, it is possible to dynamically adjust a response transmission delay time within the range from the minimum response transmission delay time determined in advance to the maximum response transmission delay time determined in advance according to the number of available buffers, so that it is possible to substantially prevent a problem that the response transmission delay time is greatly increased at a specific time point. As a consequence, since a deviation of the response transmission delay time is reduced from the viewpoint of the host, the host can determine that the storage device substantially maintains a certain level of performance.

Furthermore, in accordance with the present embodiments, the response transmission delay time is dynamically adjusted, so that it is possible to substantially prevent pending of a host operation due to an insufficient buffer space. Consequently, it is possible to substantially prevent performance degradation in the storage device.

DETAILED DESCRIPTION

Various embodiments of the invention are described below with reference to the accompanying drawings. However, the present invention may be modified or changed in various ways as those in skilled in the art will understand. Thus, the present invention is not limited to the disclosed embodiments. Rather, the present invention may be embodied in many different forms, configurations and arrangements. To that end, reference herein to "an embodiment" or the like is not necessarily to only one embodiment, and different references to any such phrase are not necessarily to the same embodiment(s). Similarly, an element referred to in the singular does not preclude more than one such element, unless stated or the context indicates otherwise. Moreover, transition phrases, such as "comprising," "including," and the like are used in the open-ended sense. That is, any such phrase does not exclude elements or operations in addition to those stated.

Figure 1:
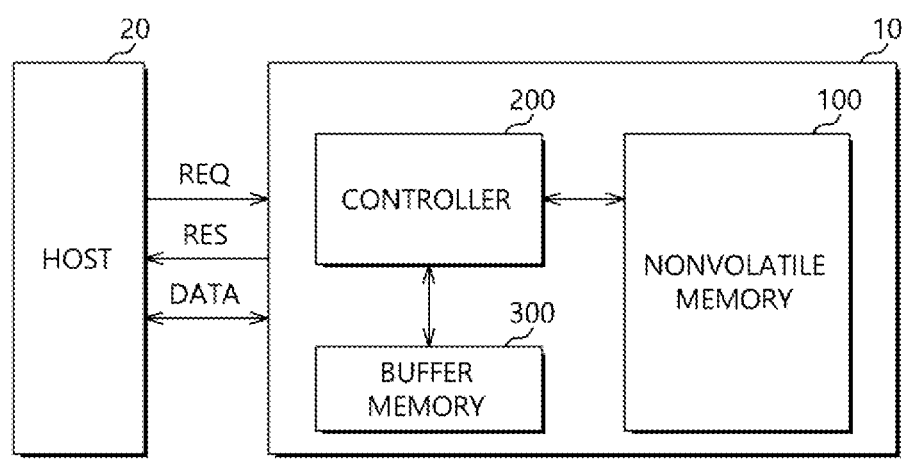
FIG. 1 is a diagram illustrating a storage device in accordance with an embodiment.

FIG. 1 is a diagram illustrating a configuration of a storage device 10 in accordance with an embodiment.

Referring to FIG. 1, the storage device 10 may store data that is accessed by a host 20 such as a cellular phone, an MP3 player, a laptop computer, a desktop computer, a game machine, a television, and/or an in-vehicle infotainment system. The storage device 10 may also be called a memory system.

The storage device 10 may be any of various types of storage devices according to an interface protocol electrically connected to the host 20. For example, the storage device 10 may be configured as any of a multimedia card in the form of a solid state drive (SSD), an MMC, an eMMC, an RS-MMC, or a micro-MMC, a secure digital card in the form of an SD, a mini-SD, or a micro-SD, a universal serial bus (USB) storage device, a universal flash storage (UFS) device, a storage device in the form of a personal computer memory card international association (PCMCIA) card, a storage device in the form of a peripheral component interconnection (PCI) card, a storage device in the form of a PCI express (PCI-E) card, a compact flash (CF) card, a smart media card, and a memory stick.

The storage device 10 may be fabricated as any of various types of packages. For example, the storage device 10 may be fabricated as any of a package on package (POP), a system in package (SIP), a system on chip (SOC), a multi-chip package (MCP), a chip on board (COB), a wafer-level fabricated package (WFP), and a wafer-level stack package (WSP).

The storage device 10 may include a nonvolatile memory 100, a controller 200, and one or more buffer memories, identified as buffer memory 300 in FIG. 1.

The nonvolatile memory 100 may operate as a data storage medium of the storage device 10. The nonvolatile memory 100 may be configured as any of various types of nonvolatile memories, such as a NAND flash memory apparatus, a NOR flash memory apparatus, a ferroelectric random access memory (FRAM) using a ferroelectric capacitor, a magnetic random access memory (MRAM) using a tunneling magneto-resistive (TMR) film, a phase change random access memory (PRAM) using chalcogenide alloys, and/or a resistive random access memory (ReRAM) using a transition metal oxide, according to memory cells.

Although FIG. 1 illustrates the nonvolatile memory 100 as one block, the nonvolatile memory 100 may include a plurality of memory chips (or dies). The present invention may be applied to the storage device 10 including a multi-chip nonvolatile memory 100.

The nonvolatile memory 100 may include a memory cell array (not illustrated) having memory cells arranged in the respective intersection regions of bit lines (not illustrated) and word lines (not illustrated). The memory cell array may include memory blocks, each of which s may include multiple pages.

For example, each memory cell of the memory cell array may be a single level cell (SLC) that stores one bit of data, a multi-level cell (MLC) capable of storing two bits of data, a triple level cell (TLC) capable of storing three bits of data, or a quad level cell (QLC) capable of storing four bits of data. Also, the memory cell array may include memory cells having a two-dimensional horizontal structure or memory cells having a three-dimensional vertical structure.

The controller 200 may control overall operation of the storage device 10. The controller 200 may process a request REQ received from a host 20. The controller 200 may generate control signals for controlling the operation of the nonvolatile memory 100 in response to the request REQ received from the host 20 and provide the generated control signals to the nonvolatile memory 100.

The controller 200 may transmit a response RES to the host 20 in response to the request REQ received from the host 20. The host 20 may transmit a subsequent request REQ to the storage device 10 after receiving the response RES from the storage device 10. Furthermore, the controller 200 may store data DATA received from the host 20 in the buffer memory 300. Furthermore, the controller 200 may store data DATA to be provided to the host 20 in the buffer memory 300.

The buffer memory 300 may be configured to temporarily store data DATA to be transmitted from the host 20 to the nonvolatile memory 100. Furthermore, the buffer memory 300 may be configured to temporarily store data DATA to be read from the nonvolatile memory 100 and transmitted to the host 20. Furthermore, the buffer memory 300 may be configured to store map data. The buffer memory 300 may include a random access memory such as a dynamic random access memory (DRAM) or a static random access memory (SRAM); however, the present invention is not limited to any particular type of buffer memory.

Figure 2:
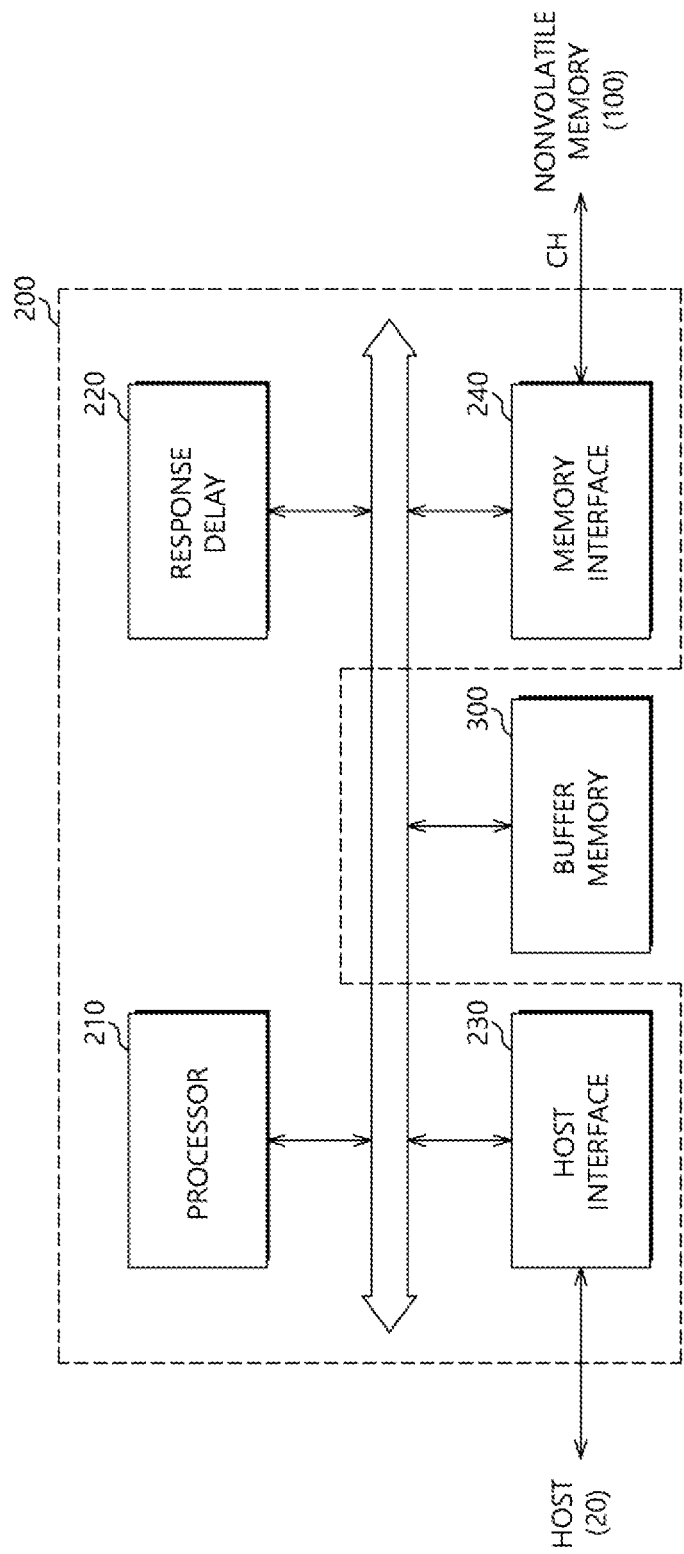
FIG. 2 and FIG. 3 are diagrams illustrating a controller of a storage device in accordance with embodiments.
Figure 3:
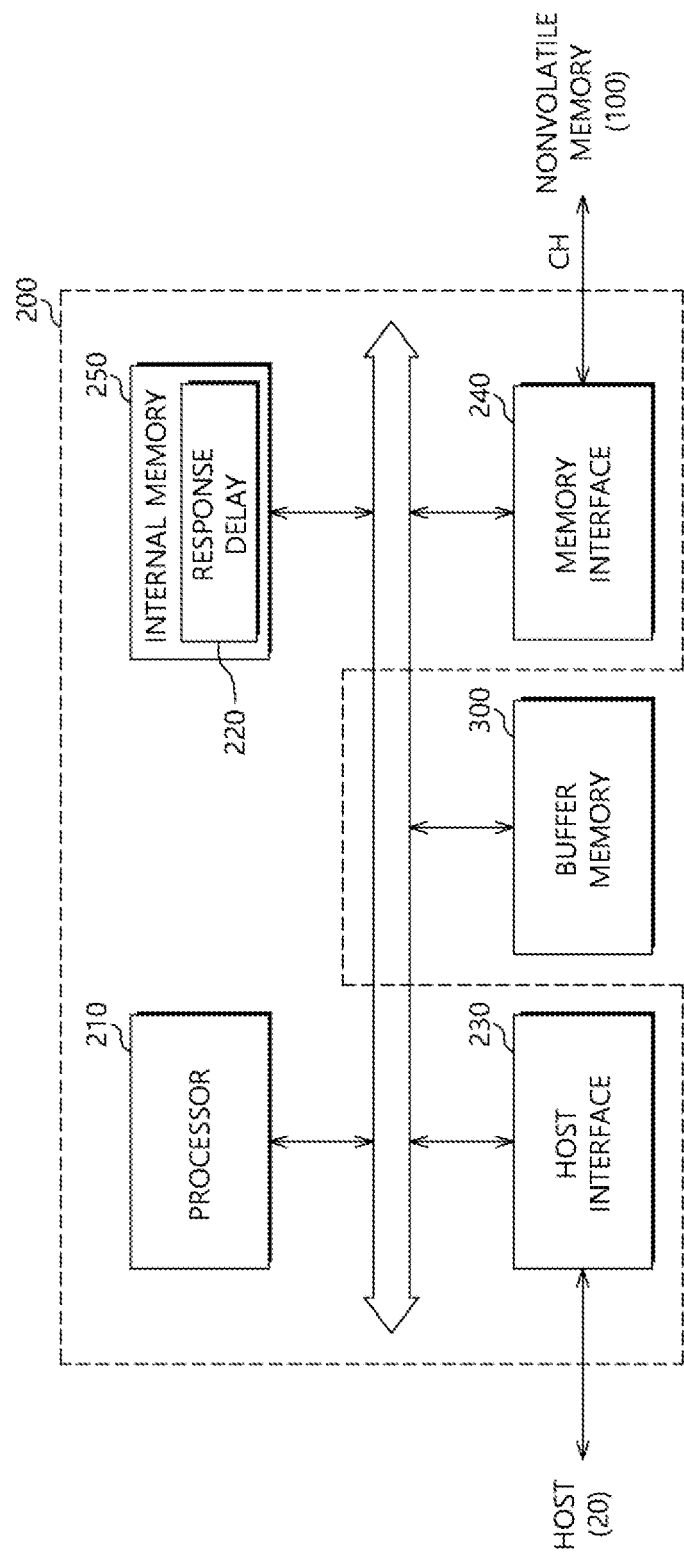

FIG. 2 and FIG. 3 are diagrams illustrating the controller 200 in accordance with an embodiment.

Referring to FIG. 2, the controller 200 may include a processor 210, a response delay component (response delay) 220, a host interface 230, and a memory interface 240.

The processor 210 may control the overall operations of the controller 200. The processor 210 may include a micro control unit (MCU) and/or a central processing unit (CPU). The processor 210 may process the request REQ transmitted from the host 20. In order to process the request REQ received from the host 20, the processor 210 may execute a code type instruction or algorithm loaded in an internal memory (not illustrated), that is, software, and control internal functional blocks and the nonvolatile memory 100.

The response delay 220 may monitor the buffer memories 300 in real-time to detect the number of currently available buffer memories 300 (or the available size of one or more buffer memories), and delay the output of a response RES corresponding to the request REQ received from the host 20 according to the number of currently available buffer memories 300 or available size thereof). A detailed configuration and operation of the response delay 220 will be described with reference to FIG. 5 and FIG. 6.

The host interface 230 may serve as an interface between the host 20 and the storage device 10. For example, the host interface 230 may communicate with the host 20 using any of standard transmission protocols such as an universal serial bus (USB), an universal flash storage (UFS), a multimedia card (MMC), a parallel advanced technology attachment (PATA), a serial advanced technology attachment (SATA), a small computer system interface (SCSI), a serial attached SCSI (SAS), a peripheral component interconnection (PCI), and/or a PCI express (PCI-E).

The memory interface 240 may control the nonvolatile memory 100 under the control of the processor 210. The memory interface 240 may be called a memory controller, a flash control top (FCT) and the like. The memory interface 240 may provide control signals to the nonvolatile memory 100. The control signals may include a command, an address and the like for controlling the nonvolatile memory 100. The memory interface 240 may provide data to the nonvolatile memory 100 or receive data from the nonvolatile memory 100. The memory interface 240 may be electrically connected to the nonvolatile memory 100 through a channel CH including one or more signal lines.

Referring to FIG. 3, the controller 200 may further include an internal memory 250, which may store the response delay 220. For example, the response delay 220 illustrated in FIG. 2 may be implemented by hardware. Alternatively, the response delay 220 illustrated in FIG. 3 may be implemented by software, or a combination of hardware and software. In an embodiment, the response delay 220 of FIG. 3 may be a set of source codes configured to monitor the buffer memories 300 and delay the output of the response RES corresponding to the request REQ received from the host 20, according to the number of available buffer memories 300.

The internal memory 250 may include a random access memory such as a dynamic random access memory (DRAM) or a static random access memory (SRAM). As described above, the internal memory 250 may store software (firmware) that is executed by the processor 210. Furthermore, the internal memory 250 may store data required for executing the software, for example, meta data. That is, the internal memory 250 may operate as a working memory of the processor 210.

When the nonvolatile memory 100 is configured as a flash memory apparatus, the processor 210 may execute software called a flash translation layer (FTL) in order to control operation of the nonvolatile memory 100 and provide device compatibility to the host 20. Through the execution of the flash translation layer (FTL), the host 20 may recognize and use the storage device 10 as a general storage such as a hard disk. The flash translation layer (FTL) loaded in the internal memory 250 may be composed of modules for performing various functions and meta data for executing the modules. The flash translation layer (FTL) may include a read module, a write (or program) module, a map module, a power management module, a wear-leveling module, a bad block management module, a garbage collection module and the like; however, the configuration of the flash translation layer (FTL) is not limited to the aforementioned modules. The response delay 220 of FIG. 3 may be called a response delay module.

FIG. 1 to FIG. 3 illustrate an example in which the buffer memory 300 is disposed externally to the controller 200; however, the present invention is not limited to that arrangement; the buffer memory 300 may be disposed within the controller 200.

Figure 4:
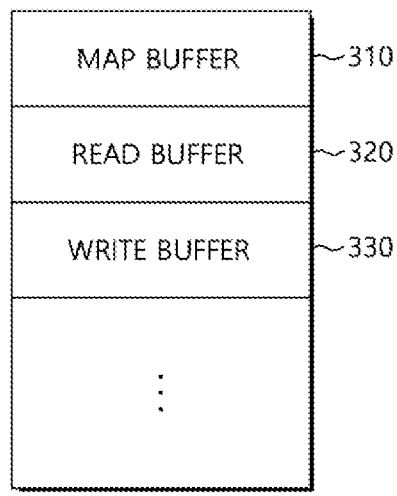
FIG. 4 is a diagram illustrating a buffer memory, such as that of FIG. 1.

FIG. 4 is a diagram illustrating the buffer memory 300.

Referring to FIG. 4, the buffer memory 300 may include a map buffer 310, a read buffer 320, a write buffer 330 and the like.

The map buffer 310 may store the map data. The map data may include a plurality of logical address to physical address (L2P) entries including logical addresses and physical addresses mapped to the logical addresses. The map data may be stored in a specific region (for example, a system data region) of the nonvolatile memory 100, and when the storage device 10 is powered on, the map data may be read from the specific region and stored in the map buffer 310. The map data stored in the map buffer 310 may be updated by a map module executed by the processor 210. Furthermore, when a read request and a read logical address are received from the host 20, the processor 210 translates the read logical address to a corresponding physical address on the basis of the map data stored in the map buffer 310, and provides the translated physical address to the nonvolatile memory 100 through the memory interface 240 together with a read command.

The read buffer 320 may store read data read from the nonvolatile memory 100. The processor 210 may transmit the read data stored in the read buffer 320 to the host 20 through the host interface 230.

The write buffer 330 may store write data received with a write request from the host 20. The processor 210 may provide the write data stored in the write buffer 330 to the nonvolatile memory 100 through the memory interface 240 together with a write command.

Since the data transmission rate between the host 20 and the controller 200 is different than the operation speed (for example, a read operation speed and a write operation speed) of the nonvolatile memory 100, the buffer memory 300 may serve as a buffer for data flow. That is, since the data transmission rate between the host 20 and the controller 200 is relatively faster than the operation speed of the nonvolatile memory 100, when continuous write request and write data are received from the host 20, the nonvolatile memory 100 is not able to process the write request and write data in real-time. Accordingly, in order to temporarily store such write data until the nonvolatile memory 100 is ready to receive such data, the buffer memory 300, specifically, the write buffer 330 is used.

When the write request and the write data are received from the host 20, the controller 200 stores the write data in the write buffer 330 of the buffer memory 300 and transmits a response to the write request to the host 20 upon the completion of the storing. The host 20 transmits the write request and the write data to the controller 200, and then waits until the response is received from the controller 200.

Even in a situation where the host 20 needs to transmit subsequent write request and write data to the controller 200 the host 20 does not transmit the subsequent write request and write data to the controller 200 in the absence of response from the controller 200. After a response is received from the controller 200, the host 20 transmits the subsequent write request and write data to the controller 200. The write data stored in the write buffer 330 may be deleted from the write buffer 330 after being stored in the nonvolatile memory 100. As described above, since the operation speed of the nonvolatile memory 100 is relatively slow, the speed at which subsequent write data is stored in the write buffer 330 may be faster than that at which the write data in the write buffer 330 is stored in the nonvolatile memory 100. As a result, the write buffer 330 becomes filled with write data, leaving no empty space for additional write data.

When there is no empty space in the write buffer 330, the controller 200 is not able to store any more write data received from the host 20 in the write buffer 330. Therefore, when there is no empty space in the write buffer 330, the controller 200 does not transmit a response to a write request, which has been last received from the host 20, to the host 20. Accordingly, the host 20 may wait without transmitting any more write request and write data to the controller 200.

Then, when empty space becomes available in the write buffer 330, the controller 200 transmits the response to the last-received write request to the host 20, and in response the host 20 may transmit subsequent write request and write data to the controller 200.

As described above, when the write buffer 330 is full, a write response transmission delay time (write latency) between the host 20 and the controller 200 is greatly increased. That is, a response, which is transmitted to the host 20 immediately after write data is stored in the write buffer 330 until the write buffer 330 is full, is transmitted to the host 20 after a very long time passes when the write buffer 330 is full.

In the present disclosure, the write response transmission delay time (or more simply response transmission delay time) may indicate a time interval from the time at which the host 20 has transmitted a write request to the controller 200 to the time at which the host 20 has received a response corresponding to the write request from the controller 200.

When the write buffer 330 fills up, which may occur frequently and in a short time, the controller 200 does not transmit a response to the host 20 for a long time, which may occur repeatedly. Therefore, the deviation of the response transmission delay time between the host 20 and the controller 200 may be large, which may be a factor that degrades the operational performance of the storage device 10.

Accordingly, the controller 200 in accordance with an embodiment may acquire the number of currently available write buffers 330 by monitoring the write buffers 330 of the buffer memory 300 in real-time and adjust the response transmission delay time in real-time according to the number of currently available write buffers 330.

The number of currently available write buffers 330 may represent the number of empty buffers among the write buffers 330. In the present disclosure, the number of currently available write buffers 330 may be indicative of the currently available size in all of the write buffers 330. The configuration and operation of adjusting the response transmission delay time in real-time according to the number of available write buffers 330 is described with reference to FIG. 5 to FIG. 10.

Figure 5:
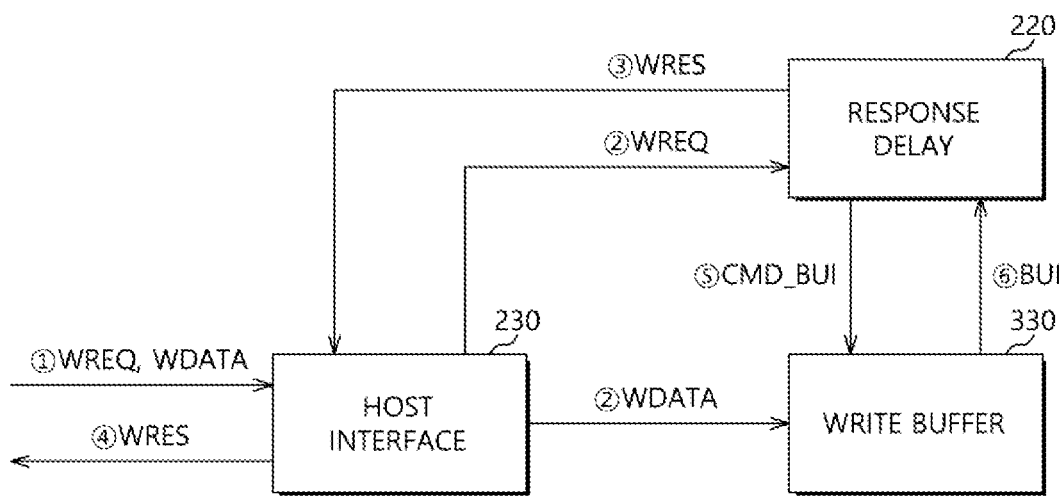
FIG. 5 is a diagram illustrating an operation of a response delay component in accordance with an embodiment.

FIG. 5 is a diagram illustrating an operation of the response delay 220 in accordance with an embodiment. FIG. 5 illustrates only components for explaining the operation of the response delay 220 in accordance with an embodiment. For clarity, components less related to the operation of the response delay 220 among the components of the controller 200 are neither illustrated nor described here.

Referring to FIG. 5, the host interface 230 may receive a write request WREQ and write data WDATA from the host 20 (see FIG. 1) (①). The host interface 230 may transmit the write data WDATA to the write buffer 330 (②). Furthermore, the host interface 230 may transmit the write request WREQ to the response delay 220 (②).

The write buffer 330 may store the write data WDATA received from the host interface 230. As the write data WDATA is stored in the write buffer 330, the response delay 220 may generate a response WRES and transmit the response WRES to the host interface 230 (③). The host interface 230 may transmit the response WRES received from the response delay 220 to the host (④).

The response delay 220 may transmit a command CMD_BUI requesting buffer usage information to the write buffer 330 (⑤). The write buffer 330 may provide the buffer usage information BUI to the response delay 220 in response to the received command CMD_BUI (⑥). The buffer usage information may include information on the currently available number (or currently available size) of the write buffers 330. The response delay 220 may set a response transmission delay time until the response WRES is transmitted to the host interface 230, according to the available number of the write buffers 330, and transmit the response WRES to the host interface 230 after the set response transmission delay time passes.

To this end, the response delay 220 may include a timer (not illustrated). For example, the response delay 220 may check the time at which the write request WREQ is received by using the timer, determine whether or not the set response transmission delay time has passed from the reception time of the write request WREQ by using the timer, and then transmit the response WRES to the host interface 230. A detailed configuration and operation of the response delay 220 is described with reference to FIG. 6.

Figure 6:
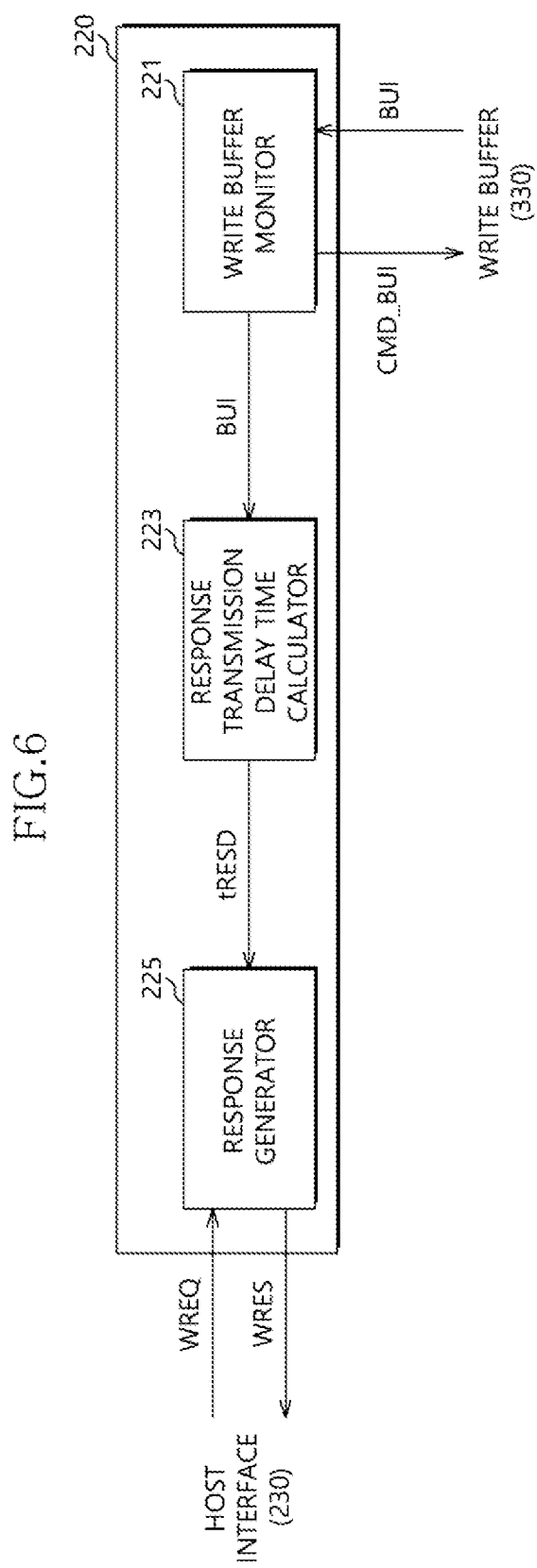
FIG. 6 is a diagram illustrating a configuration of a response delay component, such as that of FIG. 5.

FIG. 6 is a diagram illustrating a configuration of the response delay 220.

Referring to FIG. 6, the response delay 220 may include a write buffer monitor 221, a response transmission delay time calculator 223, and a response generator 225.

The write buffer monitor 221 may monitor the available number of the write buffers 330 (or available size therein) in real-time and provide a result of the monitoring to the response transmission delay time calculator 223. For example, the write buffer monitor 221 may transmit the command CMD_BUI, requesting the buffer usage information, to the write buffer 330 in real-time (or periodically), and receive the buffer usage information from the write buffer 330. As described above, the buffer usage information may include information on the currently available number (or currently available size) of the write buffers 330.

The response transmission delay time calculator 223 may determine a response transmission delay time (for example, an actual response transmission delay time) by using the buffer usage information provided from the write buffer monitor 221, that is, the available number (or available size) of the write buffers 330. For example, the response transmission delay time calculator 223 may calculate (or set) the actual response transmission delay time by using the total number (or total size) of the write buffers 330, the threshold usage number (or threshold usage size) of the write buffers 330 in which response transmission delay to the host 20 is triggered, a maximum response transmission delay time and a minimum response transmission delay time, which may be determined in advance, and the currently available number (or currently available size) of the write buffers 330.

For example, the response transmission delay time calculator 223 may set the actual response transmission delay time by using the following Equation 1.

$$t_{RESD} = ((B_t - B_u - B_a) * (D_{max} - D_{min})/(B_t - B_u)) + D_{min} \quad \text{Equation 1}$$

In Equation 1 above, '$t_{RESD}$' denotes the actual response transmission delay time, '$B_t$' denotes the total number (or total size) of the write buffers 330, '$B_u$' denotes the threshold usage number of the write buffers 330 in which response transmission delay is triggered, '$B_a$' denotes the currently available number of the write buffers 330, '$D_{max}$' denotes the maximum response transmission delay time determined in advance, and '$D_{min}$' denotes the minimum response transmission delay time, which may be determined in advance.

In the present embodiment, the maximum response transmission delay time may be determined using a command queue depth (QD) and a target response transmission delay time corresponding to the command queue depth.

Furthermore, the minimum response transmission delay time may be determined using an average response transmission delay time, which may be determined in advance, and the maximum response transmission delay time. In the present embodiment, the minimum response transmission delay time may indicate the time at which response transmission delay is triggered. The average response transmission delay time may be obtained using the total number (or total size) of the write buffers 330, the threshold usage number of the write buffers 330 in which response transmission delay is triggered, and a maximum pending time for a write operation of user data. The maximum pending time may indicate a maximum time during which the write operation of user data is pending for internal operations (for example, garbage collection write, journal update, erase operation and the like) performed in the storage device 10. The maximum pending time may be determined through a test such as a simulation.

For example, the response transmission delay time calculator 223 may obtain the average response transmission delay time, the maximum response transmission delay time, and the minimum response transmission delay time by using the following Equation 2 to Equation 4.

$$D_{av} = t_{PD}/(B_t - B_u) \quad \text{Equation 2}$$

$$D_{max} = D_{tg}/QD \quad \text{Equation 3}$$

$$D_{min} = D_{max} - (2*(D_{max} - D_{av})) \quad \text{Equation 4}$$

In Equation 2 to Equation 4 above, '$D_{av}$' denotes the average response transmission delay time, '$t_{PD}$' denotes the maximum pending time, '$D_{tg}$' denotes the target response transmission delay time, and 'QD' denotes the command queue depth.

Among the parameters used in Equation 1 to Equation 4 above, the threshold usage number of the write buffers 330 in which response transmission delay is triggered, the command queue depth (QD), and the target response transmission delay time are variable parameters. As the threshold usage number of the write buffers 330, the command queue depth (QD), and the target response transmission delay time change, the slope of a graph indicating change in the response transmission delay time according to the available number may change.

Furthermore, since only the aforementioned parameters are changed according to a product characteristic or a design change, it is possible to easily tune the response transmission delay time even though the product characteristic or the design is changed.

Figure 7:
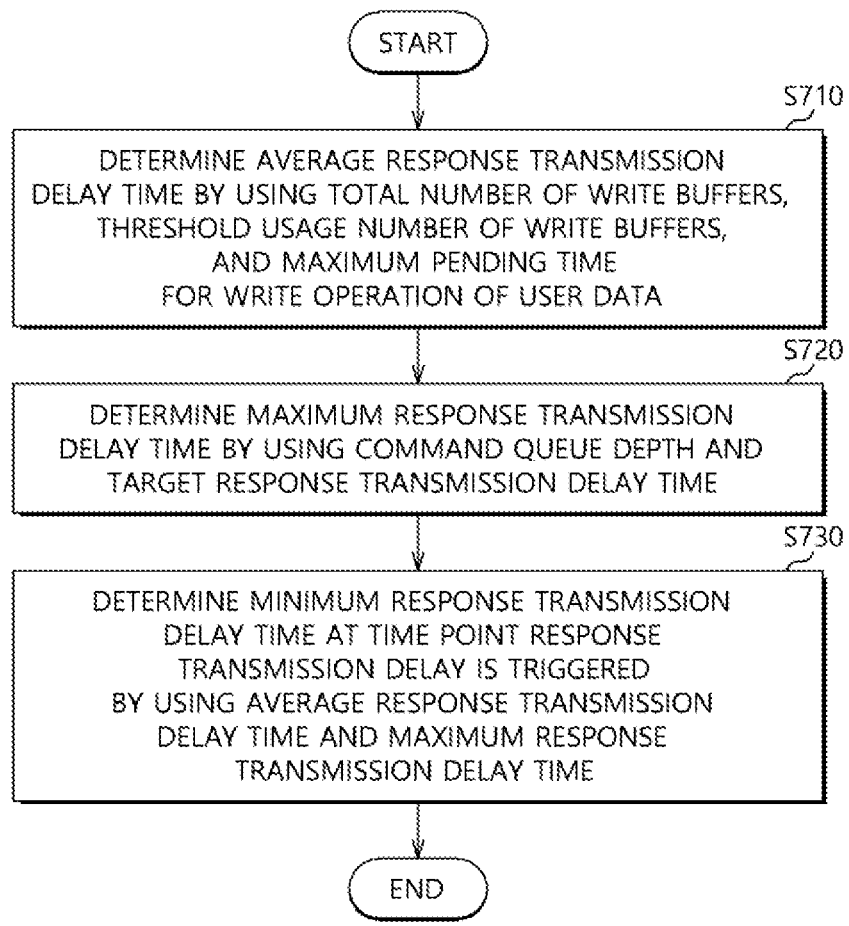
FIG. 7 is a flowchart illustrating a process of determining a maximum response transmission delay time and a minimum response transmission delay time in accordance with an embodiment.

FIG. 7 is a flowchart illustrating a process of determining the maximum response transmission delay time and the minimum response transmission delay time in accordance with an embodiment. In describing such process reference may also be made to one or more of FIG. 1 to FIG. 6.

In step S710, the average response transmission delay time may be determined (or calculated) using the total number (or total size) of the write buffers 330, the threshold usage number of the write buffers 330 in which response transmission delay is triggered, and the maximum pending time. Specifically, the average response transmission delay time may be obtained by dividing the maximum pending time by the difference between the threshold usage number of the write buffers 330 and the total number of the write buffers 330.

In step S720, the maximum response transmission delay time may be determined (or calculated) using the command queue depth (QD) and the target response transmission delay time. Specifically, the maximum response transmission delay time may be obtained by dividing the target response transmission delay time by the command queue depth.

In step S730, the minimum response transmission delay time may be determined (or calculated) using the average response transmission delay time determined in step S710 and the maximum response transmission delay time determined in step S720. The minimum response transmission delay time may indicate a time point at which response transmission delay is triggered.

Specifically, the minimum response transmission delay time may be obtained by subtracting a response transmission delay time from the maximum response transmission delay time, where the response transmission delay time corresponds to twice the difference between the average response transmission delay time and the maximum response transmission delay time.

Figure 8:
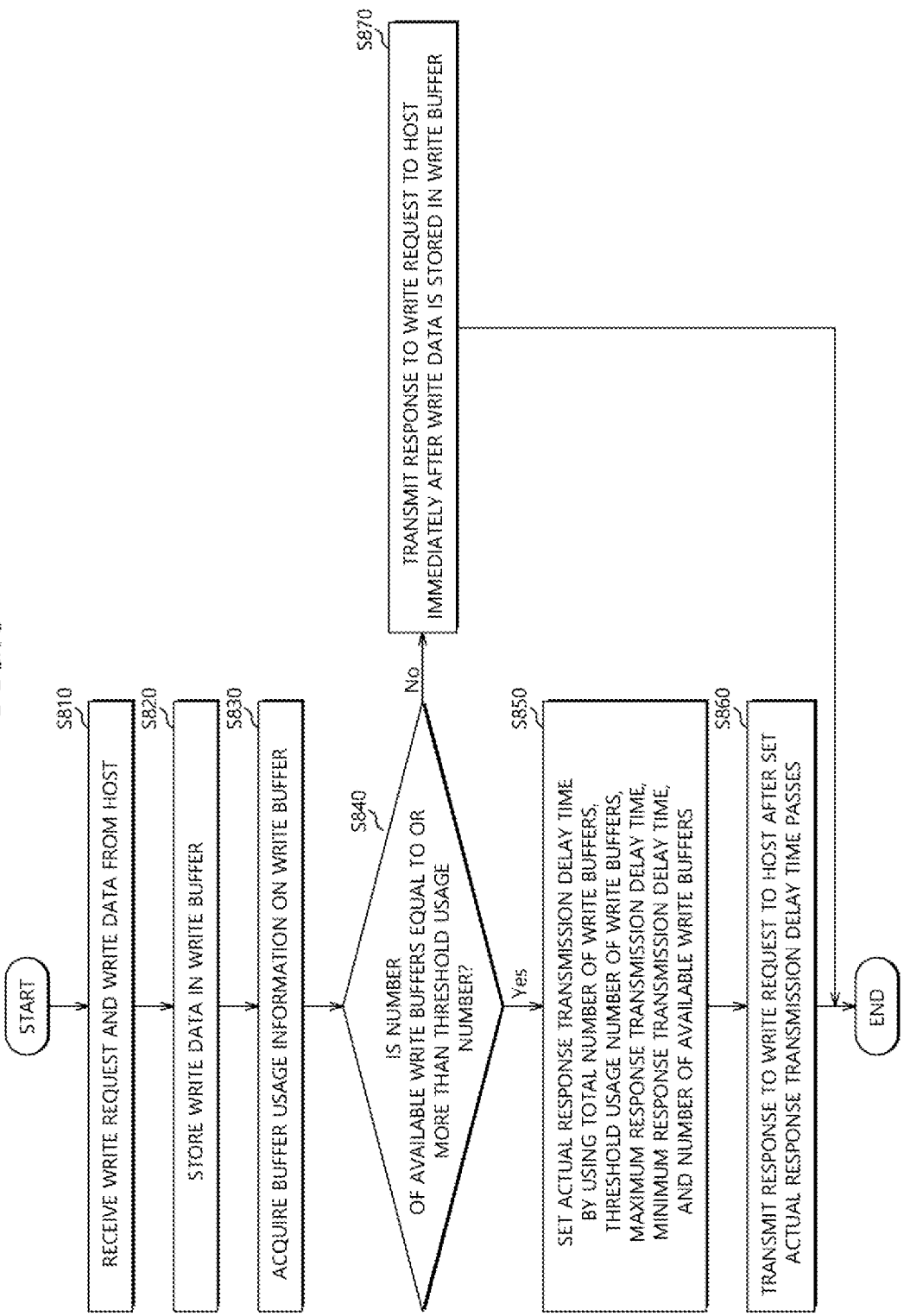
FIG. 8 is a flowchart illustrating an operating method of the storage device in accordance with an embodiment.

FIG. 8 is a flowchart illustrating an operating method of the storage device in accordance with an embodiment. In describing such operating method reference may also be made to one or more of FIG. 1 to FIG. 6.

In step S810, the controller 200 may receive a write request and write data from the host 20.

In step S820, the controller 200 may store the received write data in the write buffer 330 of the buffer memory 300.

In step S830, the response delay 220 of the controller 200 may acquire the buffer usage information on the write buffer 330. For example, the response delay 220 may transmit a command requesting the buffer usage information to the write buffer 330, which may provide the buffer usage information to the response delay 220 in response to the command. As described above, the buffer usage information may include information on the available number (or available size) of the write buffers 330.

In step S840, the response delay 220 may determine whether the available number (or available size) of the write buffers 330 is greater than or equal to the threshold usage number. When the available number (or available size) of the write buffers 330 is greater than or equal to the threshold usage number, the process may proceed to step S850. On the other hand, when the available number (or available size) of the write buffers 330 is less than the threshold usage number, the process may proceed to step S870.

In step S850, the response delay 220 may determine (or set) the actual response transmission delay time by using the total number (or total size) of the write buffers 330, the threshold usage number (or threshold usage size) of the write buffers 330 in which response transmission delay is triggered, the maximum response transmission delay time and the minimum response transmission delay time, which may be determined in advance, and the available number (or available size) of the write buffers 330 acquired in step S830.

Specifically, the response delay 220 may calculate a first value ($B_{tu}-B_u-B_a$) by a subtraction operation involving the threshold usage number, $B_u$ the available number of the write buffers 330 ($B_a$) and the total number of the write buffers 330 ($B_t$), calculate a second value by subtracting the minimum response transmission delay time ($D_{min}$) from the maximum response transmission delay time ($D_{max}$), calculate a third value by multiplying the second value by the first value, calculate a fourth value ($B_t-B_u$) by subtracting the threshold usage number of the write buffers 330 ($B_u$) from the total number of the write buffers 330 ($B_t$), calculate a result value by dividing the third value by the fourth value, and add the minimum response transmission delay time to the result value, thereby determining the actual response transmission delay time.

In step S860, the controller 200 may transmit a response to the write request received in step S810 to the host 20 after a time corresponding to the actual response transmission delay time determined in step S850 passes.

In step S870, the controller 200 may transmit a response to the write request received in step S810 to the host 20 immediately after the write data is stored in the write buffer 330.

Figure 9:
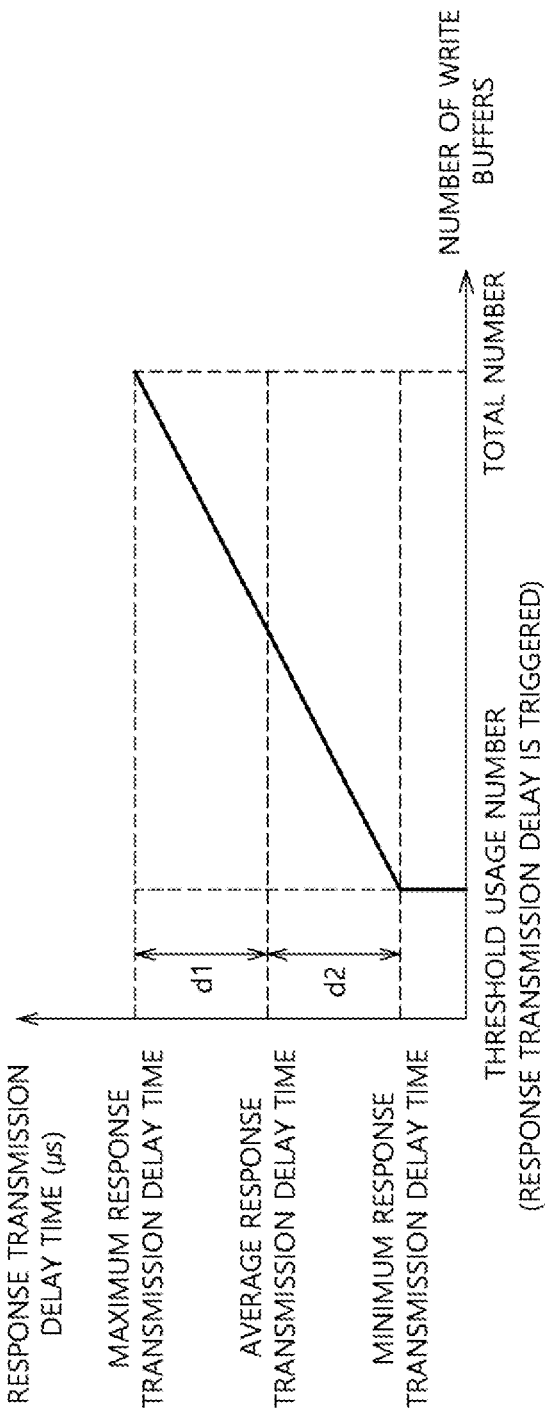
FIG. 9 is a graph illustrating a response transmission delay time according to the number of available write buffers in accordance with an embodiment.

FIG. 9 is a graph illustrating a response transmission delay time according to the available number of write buffers in accordance with an embodiment.

Referring to FIG. 9, a horizontal axis denotes the number of the write buffers 330 and a vertical axis denotes the response transmission delay time. As illustrated in FIG. 9, the time at which response transmission delay is triggered corresponds to the time at which the usage number of the write buffers 330 reaches the threshold usage number. In such a case, the response transmission delay time corresponds to the minimum response transmission delay time described above. Accordingly, the controller 200 may transmit a response to the host 20 without delay until the usage number of the write buffers 330 reaches the threshold usage number.

Referring to FIG. 9, a difference d1 between the maximum response transmission delay time and the average response transmission delay time and a difference d2 between the minimum response transmission delay time and the average response transmission delay time may be substantially equal to each other. The response transmission delay time according to the number of the write buffers 330 may increase linearly from the time at which number of the write buffers 330 corresponds to the threshold usage number. In such a case, the slope of the graph may change as one or more parameters change. Since these parameters have been described above, they are not described here.

Figure 10:
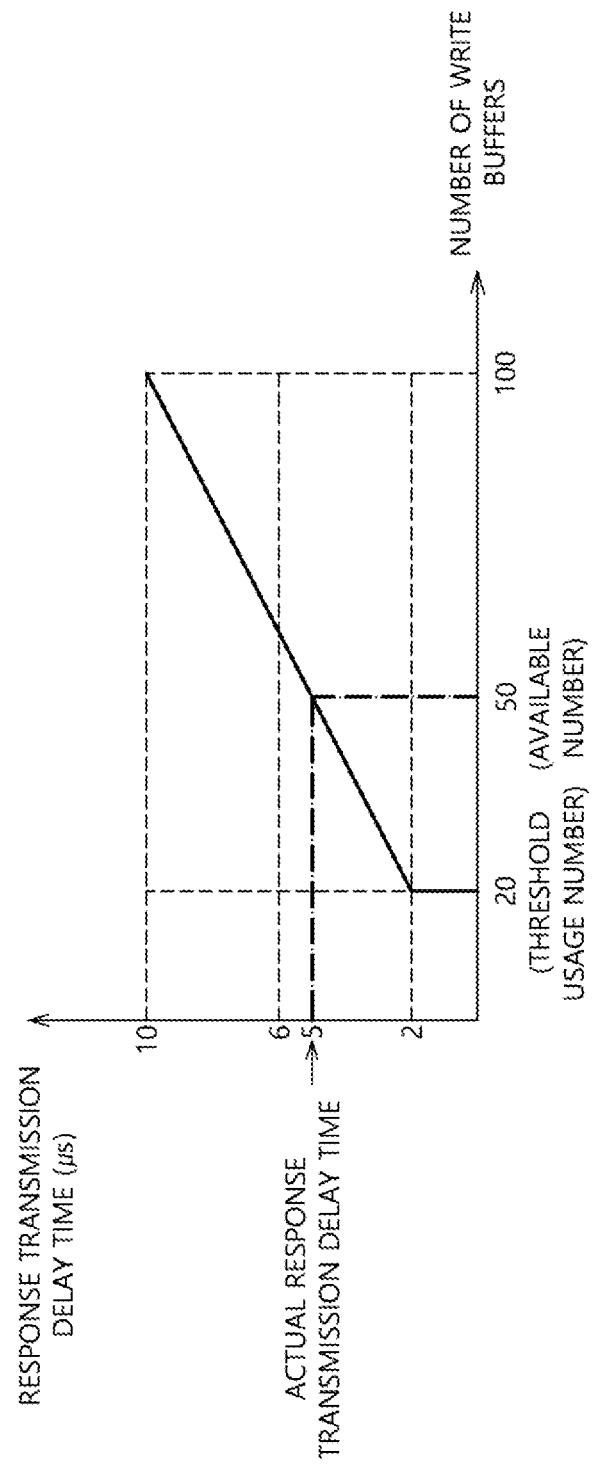
FIG. 10 is a graph illustrating an actual response transmission delay time determined according to the number of available write buffers in accordance with an embodiment.

FIG. 10 is a graph illustrating an actual response transmission delay time determined according to the available number of the write buffers in accordance with an embodiment. For example, it is assumed that the total number of the write buffers is '100', the threshold usage number of the write buffers is '20', the available number of the write buffers is '50', the maximum response transmission delay time is '10 μs', the average response transmission delay time is '6 μs', and the minimum response transmission delay time is '2 μs'.

Referring to FIG. 10, the response delay 220 may determine the actual response transmission delay time by using the buffer usage information acquired from the write buffer 330, that is, the available number '50' and Equation 1 above.

For example, it is assumed that subtracting the sum of the threshold usage number and the available number of the write buffers 330 from the total number of the write buffers 330 yields a first value, that subtracting the minimum response transmission delay time from the maximum response transmission delay time yields a second value, and that subtracting the threshold usage number of the write buffers 330 from the total number of the write buffers 330 yields a third value.

According to the above assumption, the first value may be '30', the second value may be '8', and the third value may be '80'. Dividing the product of the first value and the second value ('240') by the third value '80', the result is '3'; and adding the minimum response transmission delay time '2' to '3', the actual response transmission delay time $t_{RESD}$ is '5'. Accordingly, the response delay 220 may transmit a response to the host 20 after a response transmission delay time of '5 μs' passes.

That is, in the present disclosure, it is possible to dynamically adjust the response transmission delay time (that is, the actual response transmission delay time) within a range from a minimum response transmission delay time to a maximum response transmission delay time, either or both of which may be determined in advance, according to the available number of the write buffers 330. As described above, the response transmission delay time is dynamically adjusted within a set range, so that it is possible to avoid or substantially limit a significant increase in the response transmission delay time at any time during operation. As a consequence, since the response transmission delay time is reduced and maintained within an acceptable range, the host recognizes that the storage device substantially maintains a certain level of performance and thus can more efficiently interact with the storage device.

Figure 11:
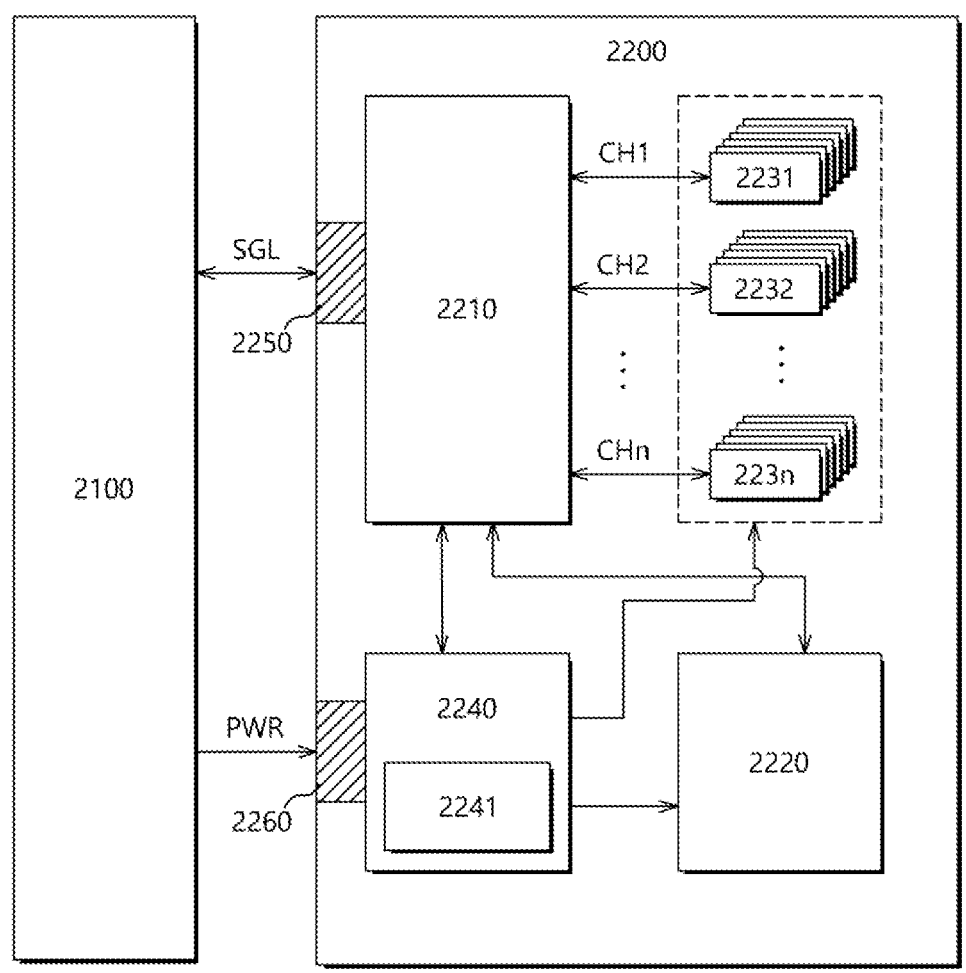
FIG. 11 is a diagram illustrating a data processing system including a solid state drive (SSD) in accordance with an embodiment.

FIG. 11 illustrates a data processing system including a solid state drive (SSD) in accordance with an embodiment. Referring to FIG. 11, a data processing system 2000 may include a host apparatus 2100 and an SSD 2200.

The SSD 2200 may include a controller 2210, a buffer memory device 2220, nonvolatile memory devices 2231 to 223n, a power supply 2240, a signal connector 2250, and a power connector 2260.

The controller 2210 may control overall operation of the SSD 2220.

The buffer memory device 2220 may temporarily store data to be stored in the nonvolatile memory devices 2231 to 223n. The buffer memory device 2220 may temporarily store data read from the nonvolatile memory devices 2231 to 223n. The data temporarily stored in the buffer memory device 2220 may be transmitted to the host apparatus 2100 or the nonvolatile memory devices 2231 to 223n according to control of the controller 2210.

The nonvolatile memory devices 2231 to 223n may be used as a storage medium of the SSD 2200. The nonvolatile memory devices 2231 to 223n may be coupled to the controller 2210 through a plurality of channels CH1 to CHn. One or more nonvolatile memory devices may be coupled to one channel. The nonvolatile memory devices coupled to the same channel may be coupled to the same signal bus and the same data bus.

The power supply 2240 may provide power PWR input through the power connector 2260 to the inside of the SSD 2200. The power supply 2240 may include an auxiliary power supply 2241. The auxiliary power supply 2241 may supply the power so that the SSD 2200 is properly terminated even when sudden power-off occurs. The auxiliary power supply 2241 may include large capacity capacitors capable of charging the power PWR.

The controller 2210 may exchange a signal SGL with the host apparatus 2100 through the signal connector 2250. The signal SGL may include a command, an address, data, and the like. The signal connector 2250 may be configured as any of various types of connectors according to an interfacing method between the host apparatus 2100 and the SSD 2200.

Figure 12:
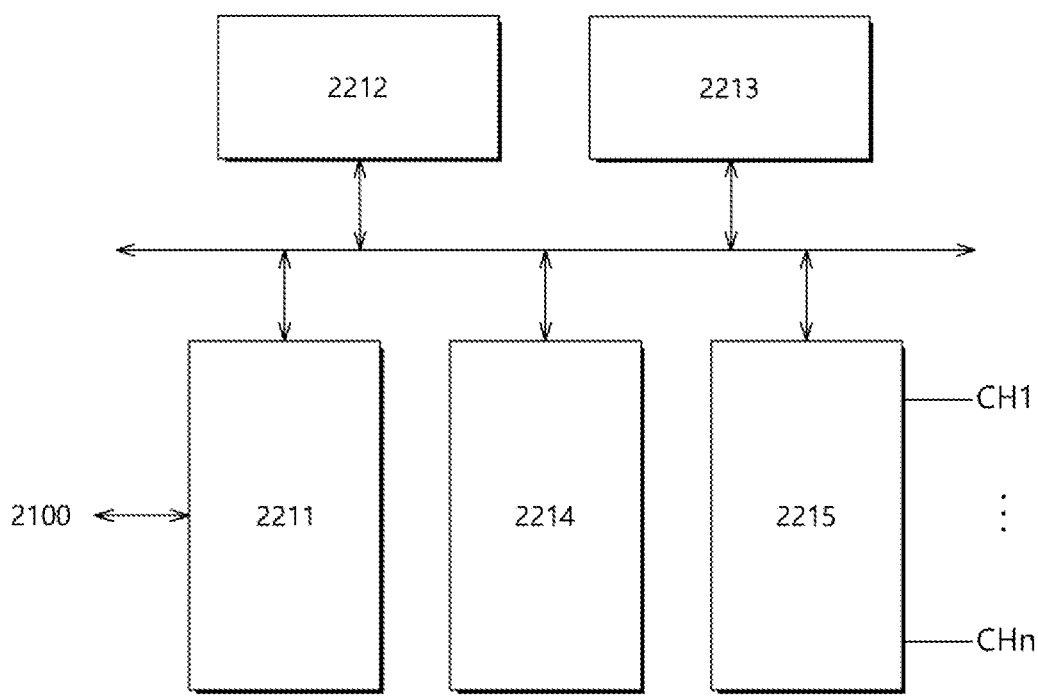
FIG. 12 is a diagram illustrating a controller, such as that illustrated in FIG. 11.

FIG. 12 illustrates the controller 2210 of FIG. 11. Referring to FIG. 12, the controller 2210 may include a host interface 2211, a control component 2212, a random access memory (RAM) 2213, an error correction code (ECC) component 2214, and a memory interface 2215.

The host interface 2211 may perform interfacing between the host apparatus 2100 and the SSD 2200 according to a protocol of the host apparatus 2100. For example, the host interface 2211 may communicate with the host apparatus 2100 through any of a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI Express (PCI-E) protocol, and a universal flash storage (UFS) protocol. The host interface unit 2211 may perform a disc emulation function that the host apparatus 2100 recognizes the SSD 2200 as a general-purpose data storage apparatus, for example, a hard disc drive HDD.

The control component 2212 may analyze and process the signal SGL input from the host apparatus 2100. The control component 2212 may control operations of internal functional blocks according to firmware and/or software for driving the SDD 2200. The RAM 2213 may be operated as a working memory for driving the firmware or software.

The ECC component 2214 may generate parity data for the data to be transferred to the nonvolatile memory devices 2231 to 223n. The generated parity data may be stored in the nonvolatile memory devices 2231 to 223n together with the data. The ECC component 2214 may detect errors in data read from the nonvolatile memory devices 2231 to 223n based on the parity data. When detected errors are within a correctable range, the ECC component 2214 may correct the detected errors.

The memory interface 2215 may provide a control signal such as a command and an address to the nonvolatile memory devices 2231 to 223n according to control of the control component 2212. The memory interface 2215 may exchange data with the nonvolatile memory devices 2231 to 223n according to control of the control component 2212. For example, the memory interface 2215 may provide data stored in the buffer memory device 2220 to the nonvolatile memory devices 2231 to 223n or provide data read from the nonvolatile memory devices 2231 to 223n to the buffer memory device 2220.

Figure 13:
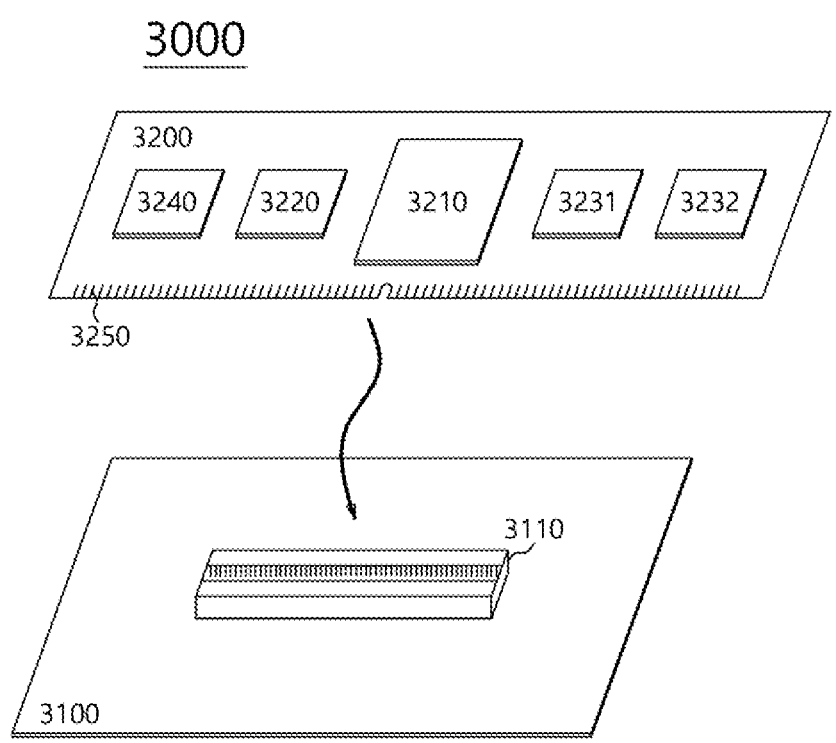
FIG. 13 is a diagram illustrating a data processing system including a data storage apparatus in accordance with an embodiment.

FIG. 13 illustrates a data processing system including a data storage apparatus in accordance with an embodiment. Referring to FIG. 13, a data processing system 3000 may include a host apparatus 3100 and a data storage apparatus 3200.

The host apparatus 3100 may be configured in a board form such as a printed circuit board (PCB). Although not shown in FIG. 13, the host apparatus 3100 may include internal functional blocks configured to perform functions of the host apparatus 3100.

The host apparatus 3100 may include a connection terminal 3110 such as a socket, a slot, or a connector. The data storage apparatus 3200 may be mounted on the connection terminal 3110.

The data storage apparatus 3200 may be configured in a board form such as a PCB. The data storage apparatus 3200 may refer to a memory module or a memory card. The data storage apparatus 3200 may include a controller 3210, a buffer memory device 3220, nonvolatile memory devices 3231 to 3232, a power management integrated circuit (PMIC) 3240, and a connection terminal 3250.

The controller 3210 may control overall operation of the data storage apparatus 3200. The controller 3210 may be configured the same or substantially the same as the controller 2210 illustrated in FIG. 12.

The buffer memory device 3220 may temporarily store data to be stored in the nonvolatile memory devices 3231 and 3232. The buffer memory device 3220 may temporarily store data read from the nonvolatile memory devices 3231 and 3232. The data temporarily stored in the buffer memory device 3220 may be transmitted to the host apparatus 3100 or the nonvolatile memory devices 3231 and 3232 according to control of the controller 3210.

The nonvolatile memory devices 3231 and 3232 may be used as a storage medium of the data storage apparatus 3200.

The PMIC 3240 may provide power input through the connection terminal 3250 to the inside of the data storage apparatus 3200. The PMIC 3240 may manage the power of the data storage apparatus 3200 according to control of the controller 3210.

The connection terminal 3250 may be coupled to the connection terminal 3110 of the host apparatus 3100. A signal such as a command, an address, and data and power may be transmitted between the host apparatus 3100 and the data storage apparatus 3200 through the connection terminal 3250. The connection terminal 3250 may be configured in various forms according to an interfacing method between the host apparatus 3100 and the data storage apparatus 3200. The connection terminal 3250 may be arranged on or in any side of the data storage apparatus 3200.

Figure 14:
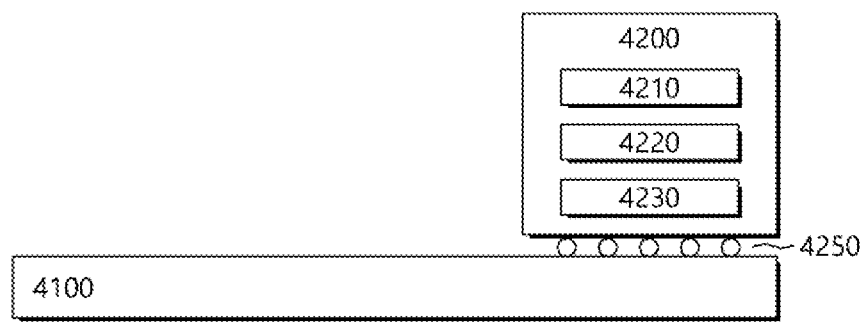
FIG. 14 is a diagram illustrating a data processing system including a data storage apparatus in accordance with an embodiment.

FIG. 14 illustrates a data processing system including a data storage apparatus in accordance with an embodiment. Referring to FIG. 14, a data processing system 4000 may include a host apparatus 4100 and a data storage apparatus 4200.

The host apparatus 4100 may be configured in a board form such as a PCB. Although not shown in FIG. 14, the host apparatus 4100 may include internal functional blocks configured to perform functions of the host apparatus 4100.

The data storage apparatus 4200 may be configured in a surface mounting packaging form. The data storage apparatus 4200 may be mounted on the host apparatus 4100 through a solder ball 4250. The data storage apparatus 4200 may include a controller 4210, a buffer memory device 4220, and a nonvolatile memory device 4230.

The controller 4210 may control overall operation of the data storage apparatus 4200. The controller 4210 may be configured the same or substantially the same as the controller 2210 illustrated in FIG. 12.

The buffer memory device 4220 may temporarily store data to be stored in the nonvolatile memory device 4230. The buffer memory device 4220 may temporarily store data read from the nonvolatile memory device 4230. The data temporarily stored in the buffer memory device 4220 may be transmitted to the host apparatus 4100 or the nonvolatile memory device 4230 through control of the controller 4210.

The nonvolatile memory device 4230 may be used as a storage medium of the data storage apparatus 4200.

Figure 15:
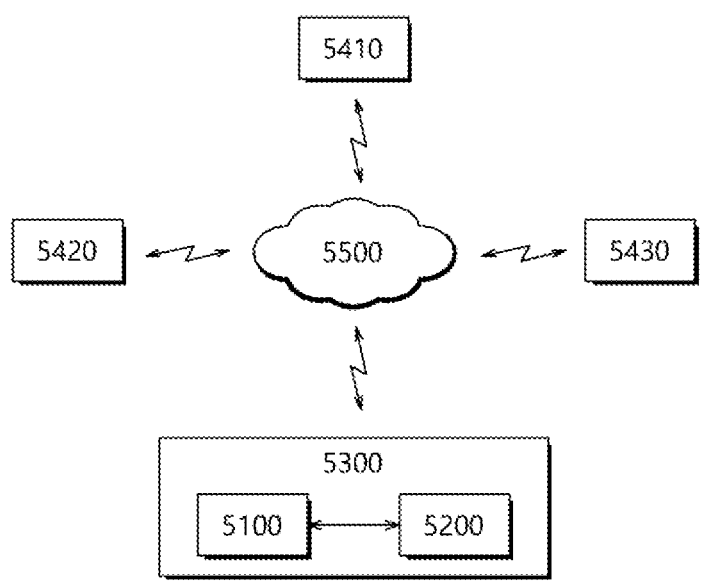
FIG. 15 is a diagram illustrating a network system including a data storage apparatus in accordance with an embodiment.

FIG. 15 illustrates a network system 5000 including a data storage apparatus in accordance with an embodiment. Referring to FIG. 15, the network system 5000 may include a server system 5300 and a plurality of client systems 5410 to 5430 which are coupled through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host apparatus 5100 and a data storage apparatus 5200. The data storage apparatus 5200 may be configured of the storage device 10 of FIG. 1, the SSD 2200 of FIG. 11, the data storage apparatus 3200 of FIG. 13, or the data storage apparatus 4200 of FIG. 14.

Figure 16:
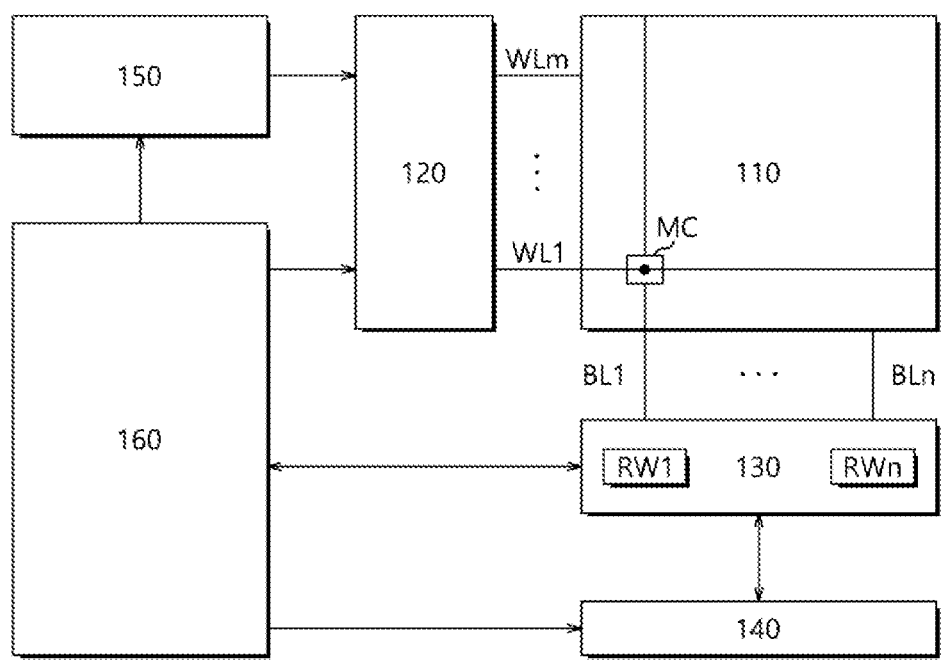
FIG. 16 is a diagram illustrating a nonvolatile memory device included in a data storage apparatus in accordance with an embodiment.

FIG. 16 illustrates a nonvolatile memory device included in a data storage apparatus in accordance with an embodiment. Referring to FIG. 16, a nonvolatile memory device 100 may include a memory cell array 110, a row decoder 120, a column decoder 140, a data read/write block 130, a voltage generator 150, and control logic 160.

The memory cell array 110 may include memory cells MC arranged in regions in which word lines WL1 to WLm and bit lines BL1 to BLn intersect.

The row decoder 120 may be coupled to the memory cell array 110 through the word lines WL1 to WLm. The row decoder 120 may operate through control of the control logic 160. The row decoder 120 may decode an address provided from an external apparatus (not shown). The row decoder 120 may select and drive the word lines WL1 to WLm based on a decoding result. For example, the row decoder 120 may provide a word line voltage provided from the voltage generator 150 to the word lines WL1 to WLm.

The data read/write block 130 may be coupled to the memory cell array 110 through the bit lines BL1 to BLn. The data read/write block 130 may include read/write circuits RW1 to RWn corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as the write driver configured to store data provided from an external apparatus in the memory cell array 110 in a write operation. In another example, the data read/write block 130 may operate as the sense amplifier configured to read data from the memory cell array 110 in a read operation.

The column decoder 140 may operate through control of the control logic 160. The column decoder 140 may decode an address provided from an external apparatus (not shown). The column decoder 140 may couple the read/write circuits RW1 to RWn of the data read/write block 130 corresponding to the bit lines BL1 to BLn and data input/output (I/O) lines (or data I/O buffers) based on a decoding result.

The voltage generator 150 may generate voltages used for an internal operation of the nonvolatile memory device 100. The voltages generated through the voltage generator 150 may be applied to the memory cells of the memory cell array 110. For example, a program voltage generated in a program operation may be applied to word lines of memory cells in which the program operation is to be performed. In another example, an erase voltage generated in an erase operation may be applied to well regions of memory cells in which the erase operation is to be performed. In another example, a read voltage generated in a read operation may be applied to word lines of memory cells in which the read operation is to be performed.

The control logic 160 may control overall operation of the nonvolatile memory device 100 based on a control signal provided from an external apparatus. For example, the control logic 160 may control an operation of the nonvolatile memory device 100 such as a read operation, a write operation, an erase operation of the nonvolatile memory device 100.

While various embodiments have been illustrated and described, it will be understood to those skilled in the art that the embodiments described are examples only. Accordingly, the present invention is not limited by or to the disclosed embodiments. Rather, the present invention encompasses all modifications and variations that fall within the scope of the claims including their equivalents.

What is claimed is:

1. A storage device comprising:
a nonvolatile memory;
a controller configured to control a write operation of the nonvolatile memory according to a write request received from a host and transmit a response to the write request to the host; and
write buffers configured to store write data received with the write request,
wherein the controller is further configured to:
set a response transmission delay time based on an available size of the write buffers, a minimum response transmission delay time, and a maximum response transmission delay time,
transmit the response to the write request to the host after the response transmission delay time passes, and
dynamically adjust, as the available size of the write buffers changes, the response transmission delay time within a range from the minimum response transmission delay time to the maximum response transmission delay time,
wherein the controller determines the minimum response transmission delay time based on the maximum response transmission delay time and an average response transmission delay time.

2. The storage device according to claim 1,
wherein the controller includes a command queue that stores the write request, and
wherein the controller determines the maximum response transmission delay time by using a depth of the command queue and a target response transmission delay time corresponding to the depth of the command queue.

3. The storage device according to claim 1, wherein the controller determines the average response transmission delay time based on a total size of the write buffers, a threshold usage size of the write buffers at which response transmission delay to the host is triggered, and a maximum pending time for the write operation.

4. The storage device according to claim 3, wherein the controller sets, as the minimum response transmission delay time, a time at which actual usage size of the write buffers reaches the threshold usage size of the write buffers.

5. The storage device according to claim 1, wherein the controller sets the response transmission delay time based further on the total size of the write buffers and the threshold usage size of the write buffers, at which response transmission delay to the host is triggered.

6. The storage device according to claim 1, wherein the controller sets the response transmission delay time in a direction approaching the maximum response transmission delay time as the available size of the write buffers decreases.

7. The storage device according to claim 1, wherein the controller sets the response transmission delay time in a direction approaching the minimum response transmission delay time as the available size of the write buffers increases.

8. The storage device according to claim 1, wherein the controller comprises:
 a host interface configured to interface with the host;
 a processor configured to control overall operations of the controller;
 a memory interface configured to interface with the nonvolatile memory; and
 a response delay configured to monitor the write buffers in real-time and dynamically set the response transmission delay time according to a change in the available size of the write buffers.

9. The storage device according to claim 8, wherein the response delay comprises:
 a write buffer monitor configured to acquire the available size from the write buffer;
 a response transmission delay time calculator configured to set the response transmission delay time by using the available size of the write buffers acquired by the write buffer monitor; and
 a response generator configured to generate a response and transmit the response to the host interface after the set response transmission delay time passes.

10. An operating method of a storage device including a nonvolatile memory, a controller, and write buffers, the operating method comprising:
 receiving, by the controller, a write request and write data from a host;
 acquiring, by the controller from the write buffers, buffer usage information including an available size of the write buffers;
 setting, by the controller, a response transmission delay time based on the available size of the write buffers, a minimum response transmission delay time, and a maximum response transmission delay time;
 transmitting, by the controller, a response to the write request to the host after the set response transmission delay time passes; and
 dynamically adjusting, by the controller, as the available size of the write buffers changes, the response transmission delay time within a range from the minimum response transmission delay time to the maximum response transmission delay time,
 wherein the minimum response transmission delay time is determined based on the maximum response transmission delay time and an average response transmission delay time.

11. The operating method according to claim 10, further comprising:
 determining, by the controller, whether an actual usage size of the write buffers is greater than or equal to a threshold usage size of the write buffers, at which response transmission delay to the host is triggered.

12. The operating method according to claim 11, wherein, when the actual usage size of the write buffers is greater than or equal to the threshold usage size of the write buffers, the controller sets the response transmission delay time.

13. The operating method according to claim 11, wherein, when the actual usage size of the write buffers is less than the threshold usage size of the write buffers, the controller transmits to the host the response to the write request without delay after the write data is stored in the write buffer.

14. The operating method according to claim 10, further comprising:
 determining, by the controller, the maximum response transmission delay time based on a depth of a command queue in the storage device and storing the write request and a target response transmission delay time corresponding to the depth of the command queue.

15. The operating method according to claim 14, further comprising:
 determining, by the controller, the average response transmission delay time based on a total size of the write buffers, the threshold usage size of the write buffers at which response transmission delay to the host is triggered, and a maximum pending time for a write operation of storing the write data in the nonvolatile memory.

16. The operating method according to claim 10, wherein the setting of the response transmission delay time is also based on the total size of the write buffers and the threshold usage size of the write buffers, in which response transmission delay to the host is triggered.

17. A controller for controlling a memory device, the controller comprising:
 a write buffer configured to buffer write data to be stored in the memory device;
 a command queue configured to queue a write request corresponding to the write data;
 a response delay configured to respond to the write request according to an actual response transmission delay time based on a total size of the write buffer, a threshold usage size of the write buffer, a currently available size of the write buffer, and minimum and maximum response transmission delay times; and
 a processor configured to control the memory device to store therein the write data in response to the write request,
 wherein the minimum response transmission delay time is determined based on the maximum response transmission delay time and an average response transmission delay time.

18. The controller of claim 17, wherein the maximum response transmission delay time is based on depth of the command queue.

* * * * *